(12) United States Patent
Ohira

(10) Patent No.: US 11,340,509 B2
(45) Date of Patent: May 24, 2022

(54) DISPLAY DEVICE AND ROOM DEVICE

(71) Applicant: Japan Display Inc., Tokyo (JP)

(72) Inventor: Hirofumi Ohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/197,419

(22) Filed: Mar. 10, 2021

(65) Prior Publication Data

US 2021/0199999 A1 Jul. 1, 2021

Related U.S. Application Data

(63) Continuation of application No. PCT/JP2019/031864, filed on Aug. 13, 2019.

(30) Foreign Application Priority Data

Sep. 11, 2018 (JP) .............................. JP2018-170073

(51) Int. Cl.
*G02F 1/137* (2006.01)
*B60R 1/12* (2006.01)
(Continued)

(52) U.S. Cl.
CPC ................ *G02F 1/137* (2013.01); *B60R 1/12* (2013.01); *G02F 1/13439* (2013.01);
(Continued)

(58) Field of Classification Search
None
See application file for complete search history.

(56) References Cited

U.S. PATENT DOCUMENTS

| 4,194,215 A * | 3/1980 | Shionoya | H04N 3/14 348/E3.016 |
| 2015/0049283 A1* | 2/2015 | Hwang | G02F 1/1347 349/96 |

(Continued)

FOREIGN PATENT DOCUMENTS

| JP | 2000122079 A | 4/2000 |
| JP | 2001318374 A | 11/2001 |

(Continued)

OTHER PUBLICATIONS

International Search Report dated Oct. 21, 2019 in connection with PCT/JP2019/031864.

*Primary Examiner* — Ryan Crockett
(74) *Attorney, Agent, or Firm* — K&L Gates LLP

(57) ABSTRACT

A display device includes a display panel, and a front panel overlapping with the display panel and being switched into a reflection state in which incident light is reflected and a transmission state in which incident light is transmitted. The front panel includes a first substrate, a second substrate facing the first substrate, a liquid crystal layer sealed between the first substrate and the second substrate, a first translucent electrode provided on a side of the first substrate on which the liquid crystal layer is located, a second translucent electrode provided on a side of the second substrate on which the liquid crystal layer is located, a discharge resistor that is electrically coupled to the second translucent electrode and is provided on the second substrate, and a first conductive pillar that electrically couples the first translucent electrode and the discharge resistor.

5 Claims, 9 Drawing Sheets

(51) Int. Cl.
 *G02F 1/1343* (2006.01)
 *H01C 13/00* (2006.01)
(52) U.S. Cl.
 CPC ...... *H01C 13/00* (2013.01); *B60R 2001/1215* (2013.01); *B60R 2300/20* (2013.01); *B60R 2300/802* (2013.01)

(56) References Cited

U.S. PATENT DOCUMENTS

| | | | | |
|---|---|---|---|---|
| 2015/0189261 | A1* | 7/2015 | Kaneko | H04N 13/337 348/57 |
| 2019/0047476 | A1* | 2/2019 | Ohira | B60R 11/04 |
| 2019/0049787 | A1* | 2/2019 | Ohira | G02F 1/1347 |
| 2020/0379296 | A1* | 12/2020 | Ohira | G02F 1/133514 |
| 2021/0188175 | A1* | 6/2021 | Ohira | G02F 1/13332 |
| 2021/0191179 | A1* | 6/2021 | Yoshida | G02F 1/163 |
| 2021/0405445 | A1* | 12/2021 | Ohira | G02F 1/1347 |

FOREIGN PATENT DOCUMENTS

| | | | |
|---|---|---|---|
| JP | 2015125428 | A | 7/2015 |
| JP | 2018084648 | A | 5/2018 |

* cited by examiner

DISPLAY DEVICE AND ROOM DEVICE

CROSS-REFERENCE TO RELATED APPLICATION

This application is a continuation of PCT international application No. PCT/2019/031864 filed on Aug. 13, 2019 which designates the United States, incorporated herein by reference, and which claims the benefit of priority from Japanese Patent Application No. 2018-170073 filed on Sep. 11, 2018, incorporated herein by reference.

BACKGROUND

1. Technical Field

The present disclosure relates to a display device and a room device that is made into a reflection state in which incident light is reflected and a transmission state in which incident light is transmitted and an image is able to be displayed.

2. Description of the Related Art

Japanese Patent Application Laid-open Publication No. 2001-318374 (JP-A-2001-318374) describes a device capable of being switched into a display state in which an image is displayed and a mirror state (reflection state) in which a reflected image is provided.

In the display device in JP-A-2001-318374, quality in the display state or quality in the mirror state can be influenced by charging between electrodes.

An object of the present disclosure is to provide a display device and a room device that can be switched into a display state in which an image is displayed and a mirror state in which a reflected image is provided and can prevent charging between electrodes.

SUMMARY

A display device according to an embodiment of the present disclosure includes a display panel, and a front panel overlapping with the display panel and being switched into a reflection state in which incident light is reflected and a transmission state in which incident light is transmitted. The front panel includes a first substrate, a second substrate facing the first substrate, a liquid crystal layer sealed between the first substrate and the second substrate, a first translucent electrode provided on a side of the first substrate on which the liquid crystal layer is located, a second translucent electrode provided on a side of the second substrate on which the liquid crystal layer is located, a discharge resistor that is electrically coupled to the second translucent electrode and is provided on the second substrate, and a first conductive pillar that electrically couples the first translucent electrode and the discharge resistor.

A room device according to an embodiment of the present disclosure that is made into a reflection state in which incident light is reflected and a transmission state in which incident light is transmitted and an image is able to be displayed is disclosed. The room device includes a display device and a shooting device shooting an image of a rear part of a vehicle. The display device includes a display panel, and a front panel overlapping with the display panel and being switched into a reflection state in which incident light is reflected and a transmission state in which incident light is transmitted, the front panel includes a first substrate, a second substrate facing the first substrate, a liquid crystal layer sealed between the first substrate and the second substrate, a first translucent electrode provided on a side of the first substrate on which the liquid crystal layer is located, a second translucent electrode provided on a side of the second substrate on which the liquid crystal layer is located, a discharge resistor that is electrically coupled to the second translucent electrode and is provided on the second substrate, and a first conductive pillar that electrically couples the first translucent electrode and the discharge resistor.

DETAILED DESCRIPTION

Figure 1:
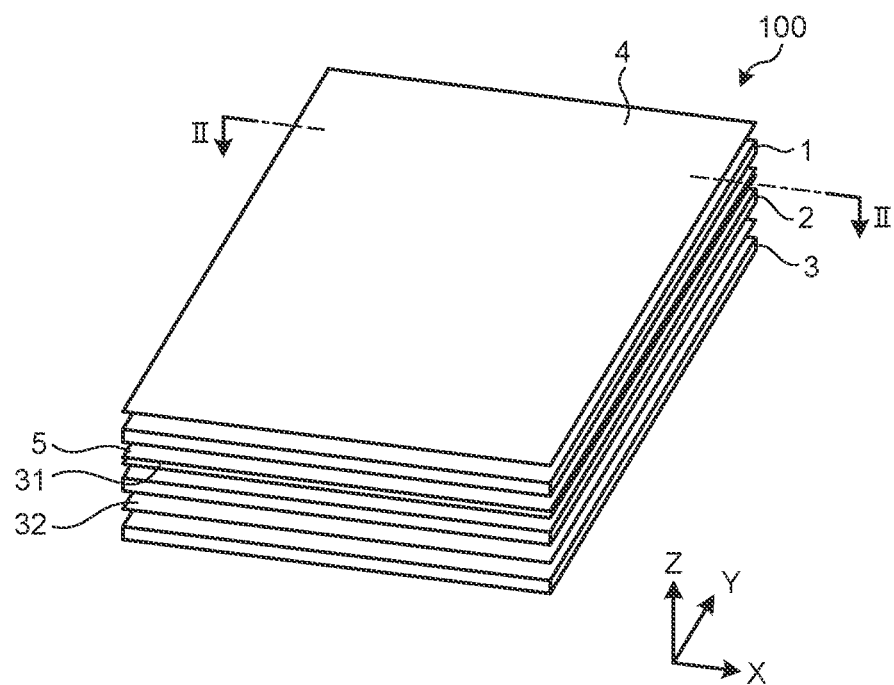
FIG. 1 is a perspective view illustrating an example of the configuration of a display device according to the embodiment.

A mode for carrying out the present disclosure (embodiment) will be described in detail with reference to the drawings. Contents described in the following embodiment do not limit the present disclosure. Components described below include those that can be easily thought of by those skilled in the art and substantially the same components. Furthermore, the components described below can be combined as appropriate. The disclosure is merely an example, and appropriate modifications within the gist of the disclosure at which those skilled in the art can easily arrive are naturally encompassed in the range of the present disclosure. In the drawings, widths, thicknesses, shapes, and the like of the components can be schematically illustrated in comparison with actual modes for clearer explanation. They are however merely examples and do not limit interpretation of the present disclosure. In the present specification and the drawings, the same reference numerals denote components similar to those described before with reference to the drawing that has been already referred, and detail explanation thereof can be omitted as appropriate.

FIG. 1 is a perspective view illustrating an example of the configuration of the display device in the embodiment. A display device 100 includes a first polarizing member 4, a front panel 1, an optical sheet 5, a second polarizing member 31, a display panel 2, a third polarizing member 32, and a backlight 3. In FIG. 1, one direction of a plane of the display panel 2 is an X direction, a direction orthogonal to the X direction in the plane of the display panel 2 is a Y direction, and a direction orthogonal to an X-Y plane is a Z direction. A side of a display surface (or an upper surface) on which the display panel 2 displays an image when seen in the Z direction is referred to as a display surface side (or an upper surface side) and a side of a rear surface (or a lower surface) that is opposite to the display surface (or the upper surface) when seen in the Z direction is referred to as a rear surface side (or a lower surface side).

The third polarizing member 32 and the backlight 3 on the rear surface side of the display panel 2 overlap with the display panel 2 when seen in the Z direction.

The backlight 3 is an illumination device emitting light toward the display panel 2. The backlight 3 has, for example, a light source and a light guiding plate, scatters light output from the light source by the light guiding plate, and outputs the light from an output surface facing the display panel 2. The backlight 3 may have a prism sheet or a diffusion sheet between the light guiding plate and the third polarizing member 32.

The first polarizing member 4, the front panel 1, the optical sheet 5, and the second polarizing member 31 on the display surface side of the display panel 2 overlap, in this order, with the display panel 2 in the Z direction. As described above, the front panel 1 overlaps with the display panel 2.

Figure 2:
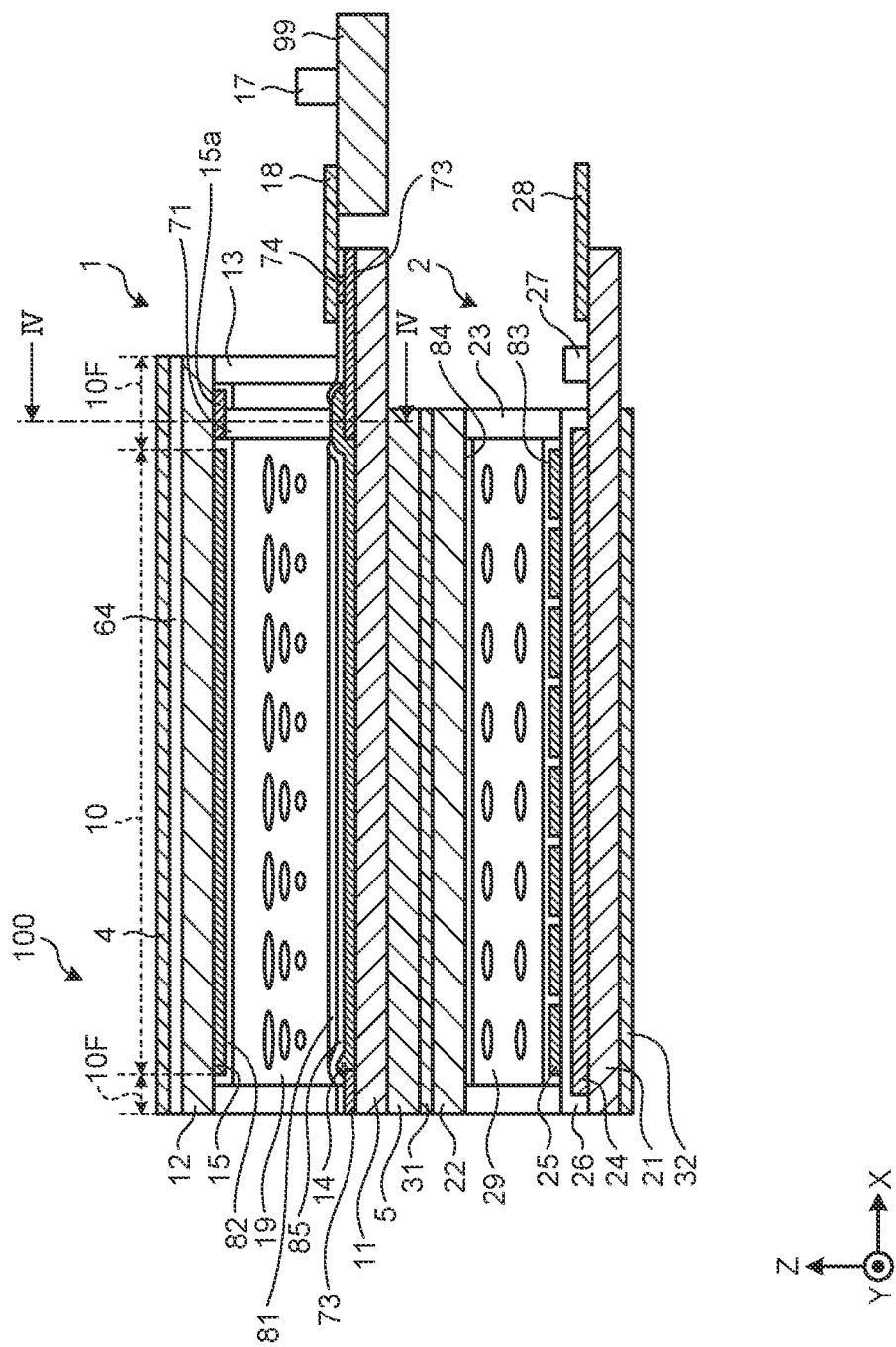
FIG. 2 is a cross-sectional view of the display device in the embodiment.
Figure 3:
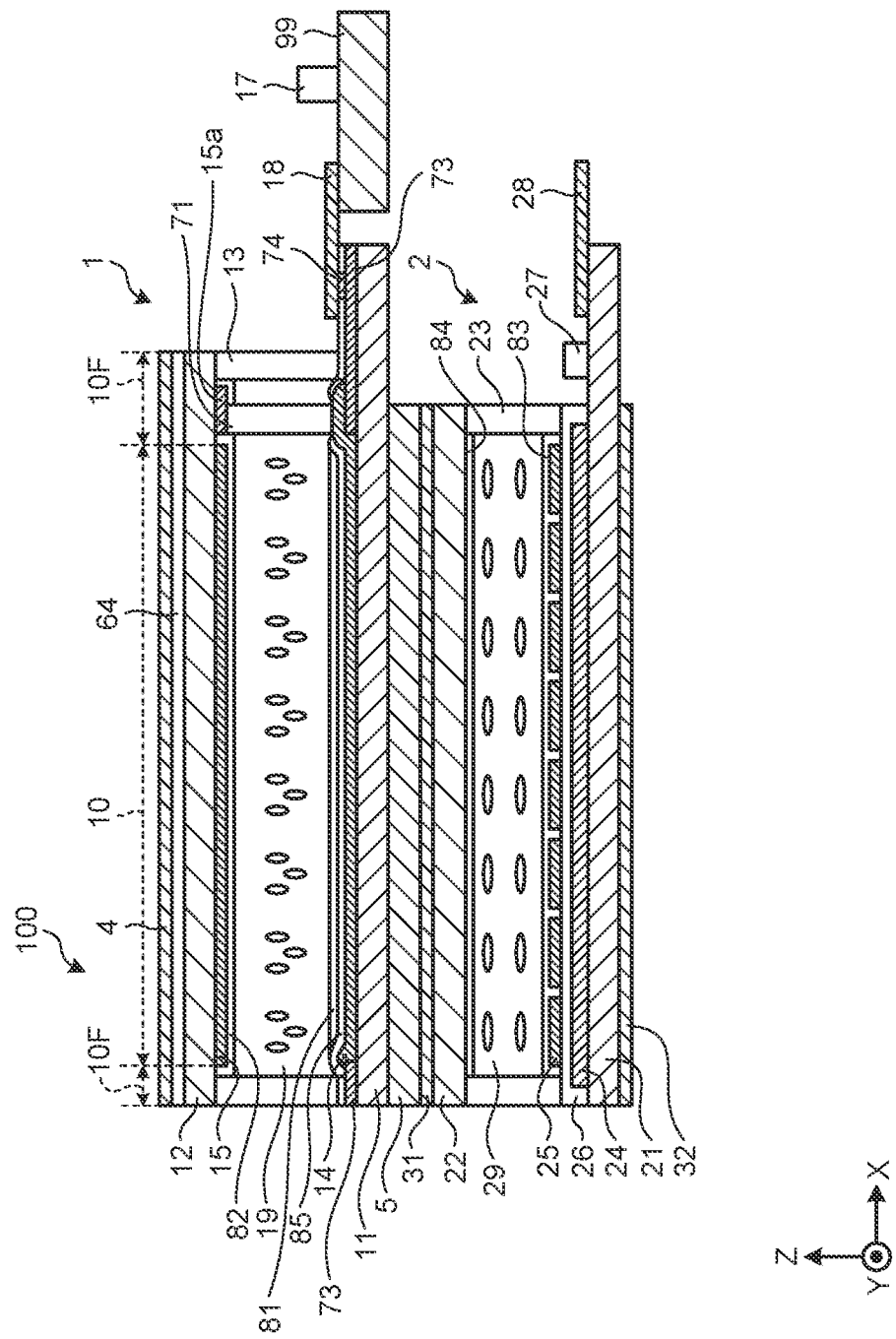
FIG. 3 is a cross-sectional view of the display device in the embodiment.
Figure 4:
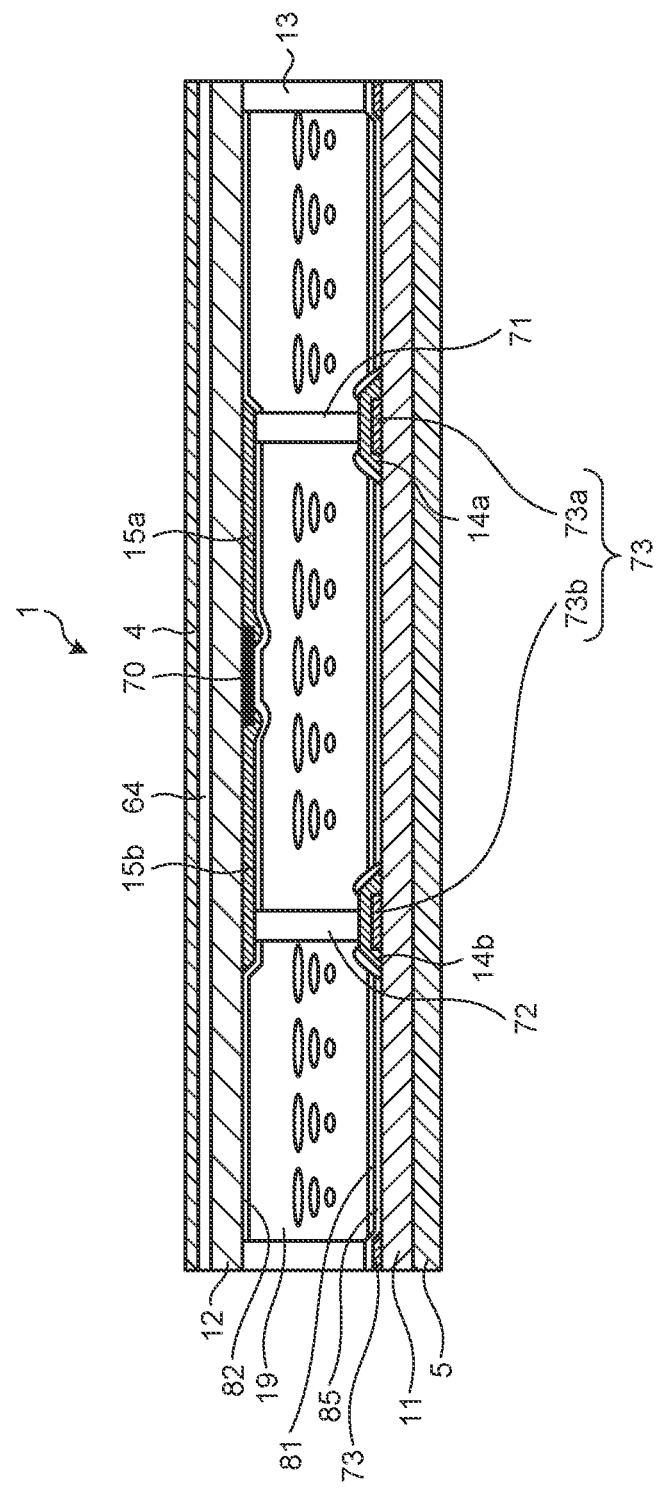
FIG. 4 is a cross-sectional view of the display device in the embodiment.
Figure 5:
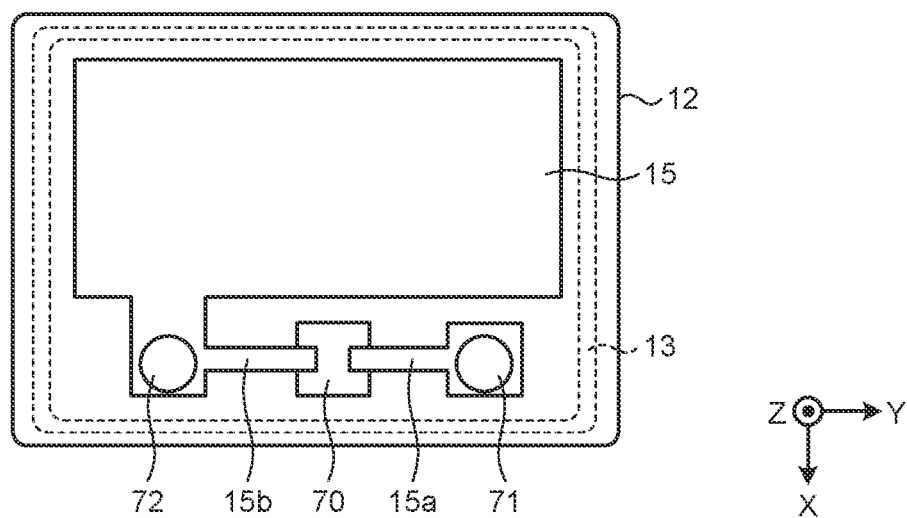
FIG. 5 is a plan view for explaining arrangement of a discharge resistor and conductive pillars on a second substrate in the embodiment.
Figure 6:
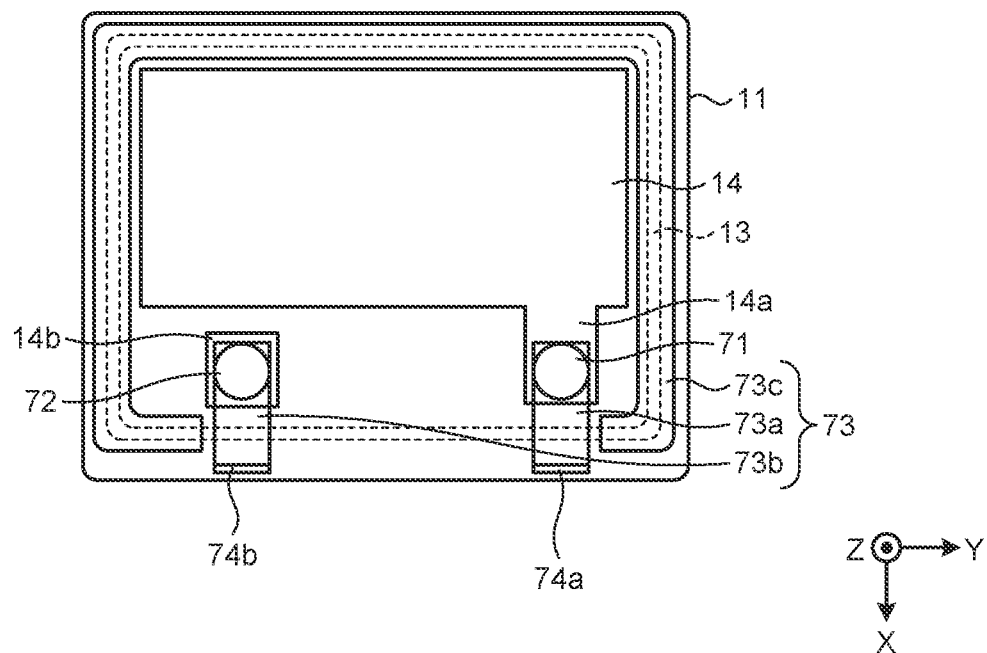
FIG. 6 is a plan view for explaining arrangement of the conductive pillars on a first substrate in the embodiment.
Figure 7:
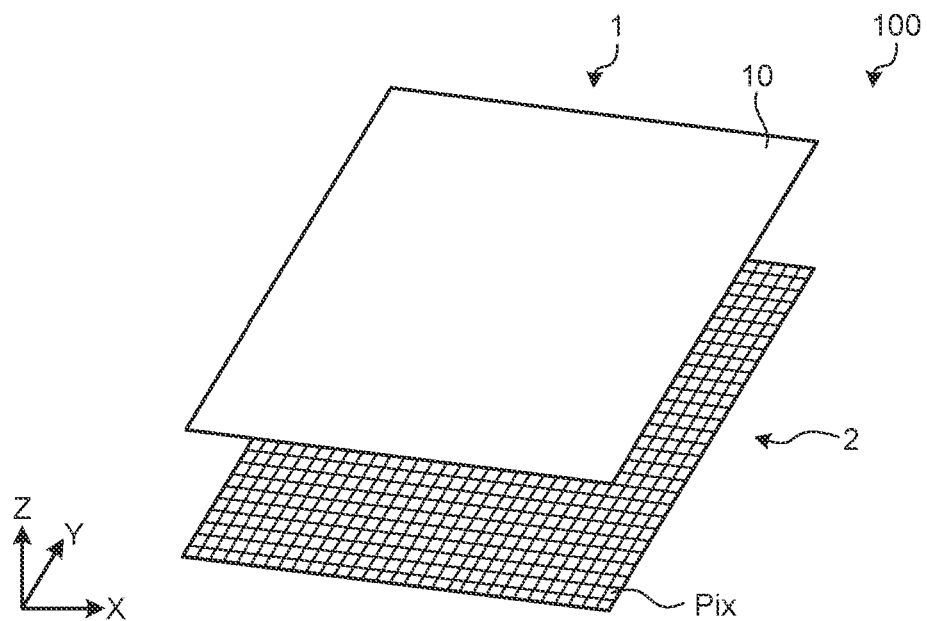
FIG. 7 is a descriptive view for schematically comparing a size of pixels of a display panel and a size of a drive electrode for explanation.

FIG. 2 is a cross-sectional view of the display device in the embodiment. FIG. 2 is a view illustrating the display device 100 in a display state in which an image is displayed. FIG. 3 is a cross-sectional view of the display device in the embodiment. FIG. 4 is a cross-sectional view of the display device in the embodiment. FIG. 3 is a view illustrating the display device 100 in a reflection state in which incident light is reflected. The cross sections in FIG. 2 and FIG. 3 are schematic cross sections cut along line II-II illustrated in FIG. 1. FIG. 4 illustrates a schematic cross section cut along line IV-IV illustrated in FIG. 2. FIG. 5 is a plan view for explaining arrangement of a discharge resistor and conductive pillars on a second substrate in the embodiment. FIG. 6 is a plan view for explaining arrangement of the conductive pillars on a first substrate in the embodiment. FIG. 7 is a descriptive view for schematically comparing a size of pixels of the display panel and a size of a drive electrode for explanation.

As illustrated in FIG. 2 and FIG. 3, the display panel 2 is a what-is-called liquid crystal display device. The display panel 2 includes a translucent substrate 21, a translucent substrate 22, and a liquid crystal layer 29 sealed by a sealing layer 23 between the substrate 21 and the substrate 22. The display panel 2 is not limited to the liquid crystal display device and may be an electro-luminescence display device or the like.

The liquid crystal layer 29 modulates light passing through the liquid crystal layer 29 in accordance with a state of an electric field. For example, a transverse electric field mode such as fringe field switching (FFS) as one mode of in-plane switching (IPS) is used for the liquid crystal layer 29 in the embodiment. The liquid crystal layer 29 is not however limited thereto, and a longitudinal electric field mode may be used therefor. For example, liquid crystal of any of various modes such as twisted nematic (TN), vertical alignment (VA), and electrically controlled birefringence (ECB) may be used for the liquid crystal layer 29.

FIG. 7 is a descriptive view for schematically comparing a size of pixels of the display panel and a size of a drive electrode for explanation. The display panel 2 displays an image. As illustrated in FIG. 7, the display panel 2 includes a large number of pixels Pix arranged in a two-dimensional array. Light output from the backlight 3 (see FIG. 1) is incident on the display panel 2. The display panel 2 displays an image by changing transmissivities of light incident on respective pixels Pix.

The display device 100 in the embodiment can be applied to both of a display device for monochrome display and a display device for color display. When the display device 100 for color display is employed, one pixel Pix (unit pixel) as a unit forming a color image includes a plurality of sub pixels. To be more specific, in the display device for color display, one pixel includes, for example, three sub pixels of a sub pixel displaying red (R), a sub pixel displaying green (G), and a sub pixel displaying blue (B).

One pixel is not limited to be configured by a combination of the sub pixels of three primary colors of RGB and can also be configured by adding one color or a plurality of colors of sub pixel(s) to the sub pixels of the three primary colors of RGB. To be more specific, one pixel can be configured by adding a sub pixel displaying white (W) for improving luminance and can also be configured by adding at least one sub pixel displaying a complementary color for enlarging a color reproduction range, for example.

A plurality of pixel electrodes 25 arranged in a matrix with a row-column configuration and a common electrode 24 are provided on the liquid crystal layer 29 side of the substrate 21 illustrated in FIG. 2 and FIG. 3. The pixel electrodes 25 and the common electrode 24 are insulated from each other by an insulating film 26 and face each other in the Z direction perpendicular to the surface of the substrate 21. The pixel electrodes 25 and the common electrode 24 are translucent electrodes made of a translucent conductive material (translucent conductive oxide) such as indium tin oxide (ITO). The substrate 21 is a translucent substrate made of glass, resin, or the like. An orientation film 83 is provided on the liquid crystal layer 29 side of the substrate 21. The third polarizing member 32 is arranged on the side of the substrate 21 that is opposite to the liquid crystal layer 29.

A color filter (not illustrated) and an orientation film 84 are provided on the liquid crystal layer 29 side of the substrate 22 illustrated in FIG. 2 and FIG. 3. The color filter includes color regions colored with three colors of red (R), green (G), and blue (B), for example. The second polarizing member 31 is arranged on the side of the substrate 22 that is opposite to the liquid crystal layer 29.

The display panel 2 includes a drive circuit 27 called a driver IC. A flexible printed circuits (FPC) 28 transmits a signal to the drive circuit 27 and drive power for driving the drive circuit 27.

As illustrated in FIG. 2 and FIG. 3, the front panel 1 includes a first substrate 11, a second substrate 12, and a liquid crystal layer 19 sealed by a sealing layer 13 between the first substrate 11 and the second substrate 12. The first substrate 11 and the second substrate 12 are translucent substrates made of glass, resin, or the like.

The liquid crystal layer 19 converts the polarization direction of the incident light passing through the liquid crystal layer 19 in accordance with a state of an electric field. For example, the TN mode is used for the liquid crystal layer 19 in the embodiment.

A first translucent electrode 14 having a size that is larger than the entire region of the pixels Pix arranged in a matrix with the row-column configuration illustrated in FIG. 7 is provided on the liquid crystal layer 19 side of the first substrate 11 illustrated in FIG. 2 and FIG. 3. A second translucent electrode 15 having a size that is larger than the entire region of the pixels Pix arranged in a matrix with the row-column configuration illustrated in FIG. 7 is provided on the liquid crystal layer 19 side of the second substrate 12. The first substrate 11 causes liquid crystal orientation of the liquid crystal layer 19 making contact with an orientation film 81 to be one direction through the orientation film 81. Similarly, the second substrate 12 causes liquid crystal orientation of the liquid crystal layer 19 making contact with an orientation film 82 to be a direction differing from the liquid crystal orientation of the orientation film making contact with the first substrate 11 through the orientation film 82. The first translucent electrode 14 and the second translucent electrode 15 face each other in the Z direction perpendicular to the surface of the first substrate 11. The first translucent electrode 14 and the second translucent electrode 15 are made of a translucent conductive material (translucent conductive oxide) such as ITO.

As illustrated in FIG. 4, the second translucent electrode 15, a discharge resistor 70, and coupling wiring lines 15a and 15b are provided on the liquid crystal layer 19 side of the second substrate 12. The coupling wiring lines 15a and 15b are formed simultaneously with the second translucent electrode 15. Accordingly, the coupling wiring lines 15a and 15b are formed in the same layer as the second translucent electrode 15 and are made of a translucent conductive material (translucent conductive oxide) such as ITO, which is the same material as that of the second translucent electrode 15.

The first translucent electrode 14 and coupling wiring lines 14a and 14b are provided on the liquid crystal layer 19 side of the first substrate 11. The coupling wiring lines 14a and 14b are formed simultaneously with the first translucent electrode 14. Accordingly, the coupling wiring lines 14a and 14b are formed in the same layer as the first translucent electrode 14 and are made of a translucent conductive material (translucent conductive oxide) such as ITO, which is the same material as that of the first translucent electrode 14. As illustrated in FIG. 5, the first translucent electrode 14 and the coupling wiring line 14a are integrally formed and are electrically coupled to each other.

As illustrated in FIG. 2, the first translucent electrode 14 is covered by an insulating film 85 made of silicon nitride. The above-mentioned orientation film 81 is stacked on the insulating film 85. In the embodiment, the first translucent electrode 14 is a drive electrode that changes a state of the liquid crystal layer 19 with an electric field while a voltage to be supplied thereto is changed. The second translucent electrode 15 is a fixed potential electrode that keeps a fixed potential with a fixed voltage.

As illustrated in FIG. 4, FIG. 5, and FIG. 6, the front panel 1 includes a first conductive pillar (first conductive member) 71 and a second conductive pillar (second conductive member) 72 as members that electrically couple the first substrate 11 and the second substrate 12. The first conductive pillar 71 and the second conductive pillar 72 are formed by conductive spacers. As illustrated in FIG. 5, the second conductive pillar 72 is electrically coupled to the second translucent electrode 15 on the second substrate 12. The conductive spacers configuring the first conductive pillar 71 and the second conductive pillar 72 are provided by applying conductive plating to spacers, by forming, on the spacers, a translucent conductive material in the same layer as the second translucent electrode, for example, or by being formed with conductive pastes.

The discharge resistor 70 is formed by, for example, a metal oxide film made of chromium oxide, ITO, or the like or a resin film. A resistance value of the discharge resistor 70 is 10 kΩ to 100 MΩ. Chromium oxide can be black, and an alignment marker may therefore be formed by chromium oxide at a position differing from that of the discharge resistor 70 in the same layer as the discharge resistor 70. An alignment marker formation process can thereby be omitted.

As illustrated in FIG. 5, the coupling wiring line 15a couples the discharge resistor 70 and the first conductive pillar 71 on the second substrate 12. The coupling wiring line 15b couples the discharge resistor 70 and the second translucent electrode 15 and the second conductive pillar 72 on the second substrate 12.

As illustrated in FIG. 2, the front panel 1 includes a metal layer 73 having conductivity that is made of aluminum or the like. As illustrated in FIG. 6, the metal layer 73 is patterned to have metal layers 73a, 17b, and 17c.

A flexible printed circuits (FPC) 18 is electrically coupled to the front panel 1 with a bonding pad 74. The bonding pad 74 has a plurality of bonding pad terminals 74a and 74b. The metal layer 73a electrically couples the coupling wiring line 14a and the bonding pad terminal 74a. The first translucent electrode 14 and the coupling wiring line 14a are electrically coupled to each other, and the metal layer 73a therefore serves as a wiring line that electrically couples the first translucent electrode 14 and the bonding pad terminal 74a. A metal layer 73b electrically couples the coupling wiring line 14b and the bonding pad terminal 74b. As illustrated in FIG. 4, the second conductive pillar 72 is formed on the coupling wiring line 14b. The metal layer 73b therefore serves as a wiring line that couples the bonding pad terminal 74b and the second conductive pillar 72 electrically coupled to the second translucent electrode 15. The second conductive pillar 72 may be formed on the metal layer 73b without providing the coupling wiring line 14b. A metal layer 73c is arranged along a frame region 10F. The metal layer 73c shades the frame region 10F such that the light transmittance of the frame region 10F is lower than the light transmittance of an active region 10. The bonding pad 74 may be made of a translucent conductive material that is the same material as that of the first translucent electrode 14. The first translucent electrode 14 and the flexible printed circuits 18 may be coupled to each other with an anisotropic conductive film (ACF).

The front panel 1 is coupled to a drive circuit 17 mounted on a print substrate 99 through the flexible printed circuits (FPC) 18. The drive circuit 17 transmits power of the first translucent electrode 14 and the second translucent electrode 15 to the front panel through the FPC 18.

A base material layer 64 made of a cycloolefin polymer is formed on the side of the second substrate 12 that is opposite to the liquid crystal layer 19. The display surface side of the base material layer 64 is subjected to rubbing processing to have specific orientation.

The first polarizing member 4 is formed on the display surface side of the base material layer 64. In other words, the first polarizing member 4 is formed on the surface of the second substrate 12 on the opposite side to the liquid crystal layer 19. The first polarizing member 4 is a coating-type polarizing layer formed by mixing a liquid crystal material and a dichroic dye. The liquid crystal material is self-oriented along the specific orientation given to the base material layer 64, so that the dichroic dye is also oriented to one direction and the first polarizing member 4 absorbs linearly polarized light in a second polarization direction orthogonal to a first polarization direction.

The optical sheet 5 transmits the linearly polarized light in the first polarization direction and reflects the linearly polarized light in the second polarization direction. The optical sheet 5 is also referred to as a reflective polarizing plate.

As illustrated in FIG. 2 and FIG. 3, the front panel 1 has the active region 10 that transmits incident light or light from the display panel 2 and the frame region 10F around the active region 10. As illustrated in FIG. 7, the area of the active region 10 is the same as the area of the display region in which all the pixels Pix are arranged.

Figure 8:
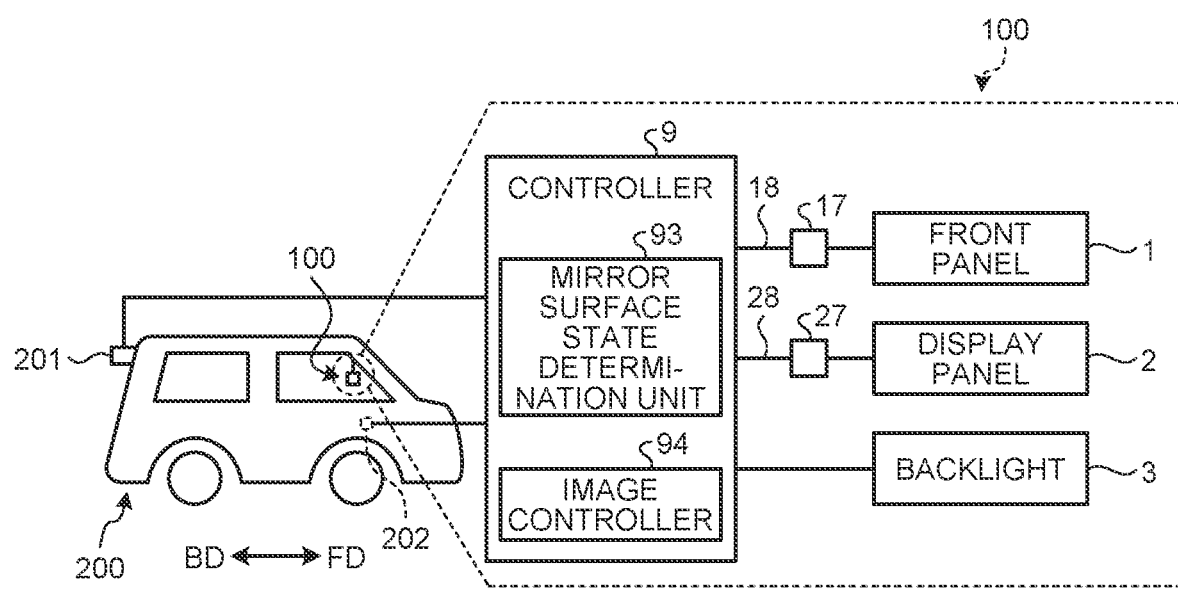
FIG. 8 is a block diagram for explaining the display device in the embodiment.

FIG. 8 is a block diagram for explaining the display device in the embodiment. The display device 100 in the embodiment is used as a room mirror in a vehicle in FIG. 8. A controller 9 is a computer including a central processing unit (CPU) as an arithmetic device and a memory as a storage device, for example. The controller 9 can also implement various functions by executing a computer program using these hardware resources.

To be specific, the controller 9 loads the computer program stored in a predetermined storage unit (not illustrated) on a memory and causes the CPU to execute instructions included in the computer program loaded on the memory. The controller 9 includes a mirror surface state determination unit 93 and an image controller 94 in the embodiment. The mirror surface state determination unit 93 and the image controller 94 are functions of the controller 9 that are implemented by executing the computer program using the hardware resources.

The image controller 94 controls lighting and extinction of the backlight 3 and the light amount and light intensity in lighting in accordance with an instruction execution result by the CPU. The image controller 94 transmits an image signal to be displayed on the display panel 2 to the drive circuit 27 through a flexible printed circuits 28 in accordance with the instruction execution result by the CPU, and the drive circuit 27 displays an image on the display panel 2. The mirror surface state determination unit 93 controls the drive circuit 17 in accordance with an instruction signal of the display state on an input unit 202 to make a state in which the drive circuit 17 applies a voltage to the first translucent electrode 14 through the FPC 18. The voltage to the first translucent electrode 14 thereby becomes equal to or higher than a threshold. Alternatively, the mirror surface state determination unit 93 controls the drive circuit 17 in accordance with an instruction signal of the reflection state on the input unit 202 to make a state in which the drive circuit 17 applies no voltage to the first translucent electrode 14 through the FPC 18. The applied voltage to the first translucent electrode 14 thereby becomes lower than the threshold.

For example, the controller 9 is coupled to a shooting device 201 of a vehicle 200, as illustrated in FIG. 8. The shooting device 201 shoots a rear part BD of the vehicle 200, and an image of the rear part BD of the vehicle 200 is transmitted to the controller 9. The display device 100 displays the image of the rear part BD of the vehicle 200 in the display state. A position at which the shooting device 201 is mounted on the vehicle may be a position enabling shooting of a front part FD of the vehicle 200 or a position enabling shooting of at least one of the surrounding of the vehicle 200 and the inside of the vehicle 200.

Figure 9:
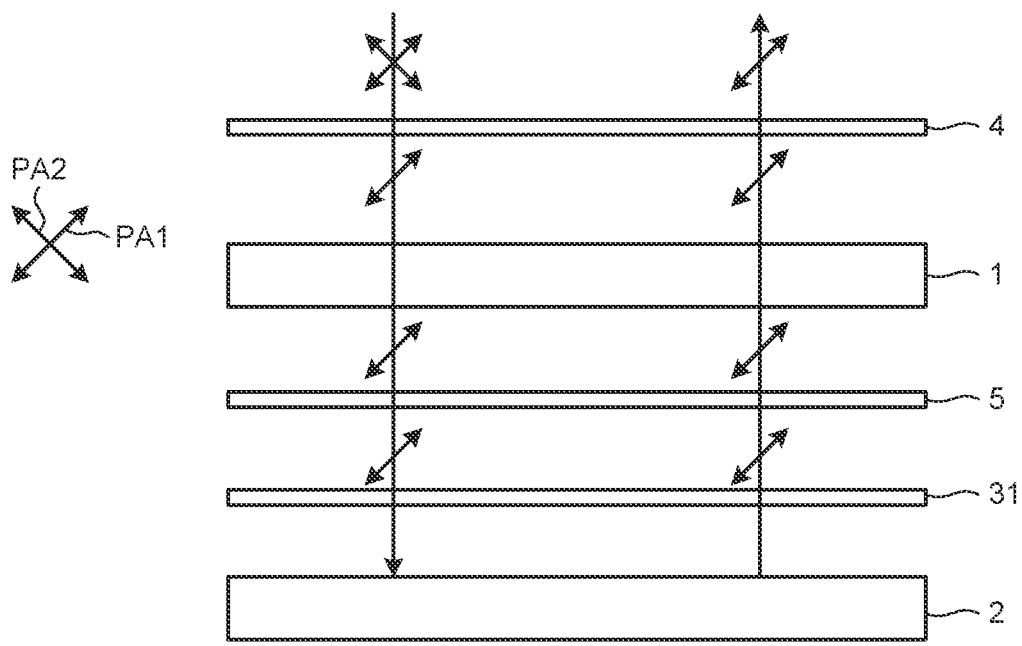
FIG. 9 is a schematic view for explaining a transmission state in which incident light is transmitted and a display state in which an image can be displayed.

FIG. 9 is a schematic view for explaining a transmission state in which incident light is transmitted and the display state in which an image is able to be displayed. As illustrated in FIG. 9, the first polarizing member 4 absorbs linearly polarized light in a second polarization direction PA2 orthogonal to a first polarization direction PA1.

The linearly polarized light in the first polarization direction PA1 passes through the first polarizing member 4 and is incident on the front panel 1. As illustrated in FIG. 3, the front panel 1 is in a state in which the drive circuit 17 applies a voltage to the first translucent electrode 14. The front panel 1 thereby outputs the linearly polarized light in the first polarization direction PA1 that has been incident from the first polarizing member 4 to the optical sheet 5 while keeping the linearly polarized light in the first polarization direction PA1.

When the display panel 2 displays an image, the first polarizing member 4, the front panel 1, and the optical sheet 5 are made into a state of opening a shutter for the linearly polarized light in the first polarization direction PA1, so that the image is easy to be viewed.

The linearly polarized light in the first polarization direction PA1 that has been incident from the front panel 1 passes through the optical sheet 5. The second polarizing member 31 transmits the linearly polarized light in the first polarization direction PA1. As described above, the image on the display panel 2 can be viewed from the display surface side of the first polarizing member 4.

The display panel 2 outputs the image with the linearly polarized light in the first polarization direction PA1 through the second polarizing member 31.

The optical sheet 5 transmits the linearly polarized light in the first polarization direction PA1 that has been incident from the display panel 2.

The front panel 1 outputs the linearly polarized light in the first polarization direction PA1 that has been incident from the optical sheet 5 to the first polarizing member 4 while keeping the linearly polarized light in the first polarization direction PA1.

The linearly polarized light in the first polarization direction PA1 passes through the first polarizing member 4 and is output, as an image, to the display surface side of the first polarizing member 4.

As described above, when the mirror surface state determination unit 93 illustrated in FIG. 8 receives the instruction signal of the transmission state on the input unit 202, the drive circuit 17 operates so as to make the transmission state in which the incident light is transmitted. The image controller 94 controls the backlight 3 and the display panel 2 to display an image on the display panel 2.

Figure 10:
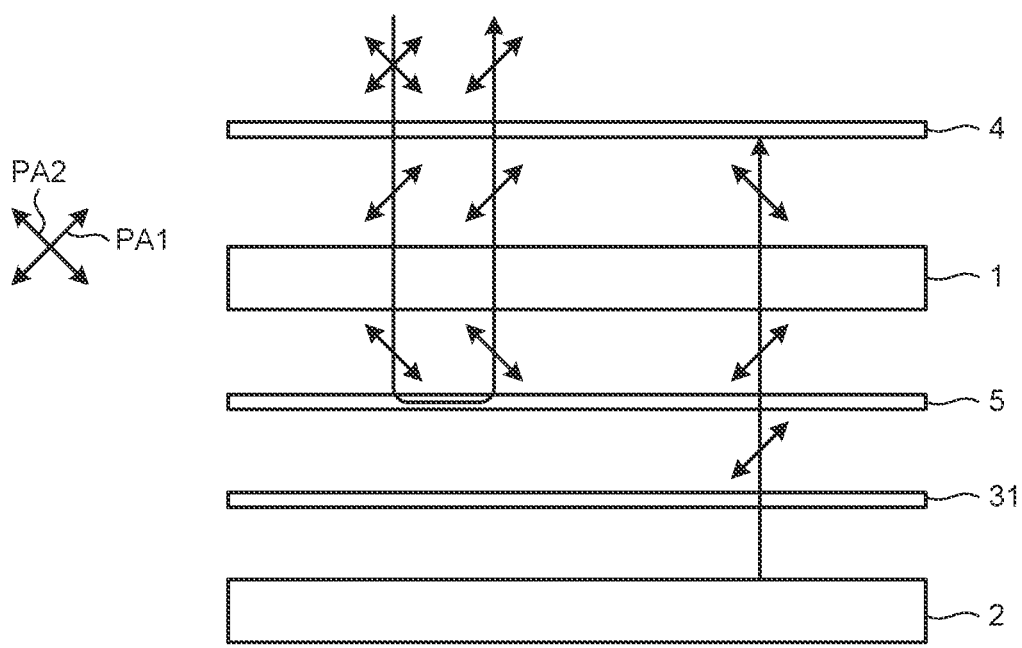
FIG. 10 is a schematic view for explaining a reflection state in which the incident light is reflected.

FIG. 10 is a schematic view for explaining the reflection state in which the incident light is reflected. As illustrated in FIG. 10, the first polarizing member 4 absorbs the linearly polarized light in the second polarization direction PA2 orthogonal to the first polarization direction PA1.

The linearly polarized light in the first polarization direction PA1 passes through the first polarizing member 4 and is incident on the front panel 1. As illustrated in FIG. 2, the front panel 1 is in a state in which the drive circuit 17 applies no voltage to the first translucent electrode 14. The front panel 1 thereby converts the linearly polarized light in the first polarization direction PA1 that has been incident from the first polarizing member 4 into the linearly polarized light in the second polarization direction PA2 and outputs it to the optical sheet 5.

The optical sheet 5 reflects the linearly polarized light in the second polarization direction PA2 that has been incident from the front panel 1.

The linearly polarized light in the second polarization direction PA2 that has been reflected by the optical sheet 5 is incident on the front panel 1. The front panel 1 converts the linearly polarized light in the second polarization direction PA2 that has been incident from the optical sheet 5 into the linearly polarized light in the first polarization direction PA1 and outputs it to the first polarizing member 4.

The linearly polarized light in the first polarization direction PA1 from the front panel 1 passes through the first polarizing member 4, and an image on the display surface side of the first polarizing member 4 is displayed like a mirror surface when seen from the display surface side of the first polarizing member 4.

Even when the display panel 2 displays an image, the first polarizing member 4, the front panel 1, and the optical sheet 5 are made into a state of closing the shutter for the linearly polarized light in the second polarization direction PA2 provided by converting the linearly polarized light in the first polarization direction PA1 that has been output from the display panel 2. As a result, the image is not easily viewed.

To be specific, the display panel 2 outputs the image with the linearly polarized light in the first polarization direction PA1 through the second polarizing member 31.

The optical sheet 5 transmits the linearly polarized light in the first polarization direction PA1 that has been incident from the display panel 2.

The front panel 1 converts the linearly polarized light in the first polarization direction PA1 that has been incident from the optical sheet 5 into the linearly polarized light in the second polarization direction PA2 and outputs it to the first polarizing member 4.

The first polarizing member 4 absorbs the linearly polarized light in the second polarization direction PA2, and the image is not easily viewed on the display surface side of the first polarizing member 4.

As described above, when the mirror surface state determination unit 93 illustrated in FIG. 8 receives the instruction signal of the reflection state on the input unit 202, the drive circuit 17 operates so as to make the reflection state in which the incident light is reflected. In the reflection state, the image is not easily viewed even when the image is displayed on the display panel 2. The image controller 94 therefore controls to display no image on the display panel 2 when the mirror surface state determination unit 93 illustrated in FIG. 8 receives the instruction signal of the reflection state on the input unit 202.

The first polarizing member 4 contains no iodine. Iodine has a property of absorbing a wavelength of visible light on the short wavelength side. When a polarizing plate causing general iodine to be adsorbed to a film of polyvinyl alcohol (PVA) and stretching in one direction to align orientations of molecules to a constant direction is used instead of the first polarizing member 4 to make the mirror state (reflection state) in which a reflected image is provided as illustrated in FIG. 10, there is the possibility that the wavelength of the reflected image on the short wavelength side is absorbed by iodine, whiteness has a greenish tint, and color shift occurs in a reflected image. Unlike this, in the display device 100 in the embodiment, the wavelength of the reflected image on the short wavelength side is not easily absorbed by the first polarizing member 4 in comparison with iodine, and the whiteness is close to neutral.

The polarizing plate causing general iodine to be adsorbed to the film of PVA and stretching in one direction to align the orientations of the molecules to a constant direction is used for the first polarizing member 4 instead of the above-mentioned coating-type polarizing plate to make the mirror state (reflection state) in which a reflected image is provided as illustrated in FIG. 10, there is the possibility that stretching of the polarizing plate deteriorates smoothness of the surface to cause unevenness in the reflected image. Unlike this, the display device 100 in the embodiment uses the first polarizing member 4 that does not stretch. The surface of the first polarizing member 4 therefore has smoothness to prevent unevenness in the reflected image. A material of the first polarizing member 4 can be selected in accordance with a desired polarizing degree and unevenness in the reflected image. Furthermore, the material of the polarizing plate can be made different for each region.

As described above, the display device 100 includes the first polarizing member 4, the optical sheet 5, the front panel 1, the second polarizing member 31, and the display panel 2. The first polarizing member 4 absorbs linearly polarized light in the second polarization direction PA2 orthogonal to the first polarization direction PA1. The optical sheet 5 reflects the linearly polarized light in the second polarization direction PA2 and transmits the linearly polarized light in the first polarization direction PA1. The front panel 1 can convert the polarization direction of the incident light into another polarization direction in accordance with the applied voltage. The front panel 1 is arranged between the first polarizing member 4 and the optical sheet 5. The display panel 2 overlaps with the front panel 1 in the Z direction through the second polarizing member 31 transmitting the linearly polarized light in the second polarization direction PA2 with respect to the optical sheet 5. The display device 100 can thereby be switched between the display state in which an image is displayed, which is illustrated in FIG. 3 and FIG. 9, and the mirror state (reflection state) in which a reflected image is provided, which is illustrated in FIG. 2 and FIG. 10.

The front panel 1 is located to be closer to an observer than the display panel 2 is. The front panel 1 can be switched into a first front panel state of outputting the incident linearly polarized light in the first polarization direction PA1 while keeping the linearly polarized light in the first polarization direction PA1 and a second front panel state of converting the incident linearly polarized light in the first polarization direction PA1 into the linearly polarized light in the second polarization direction PA2 and outputting it in accordance with a state in which the drive circuit 17 applies a voltage to the first translucent electrode 14.

Accordingly, the reflection state is made in the first front panel state and the display state is made in the second front panel state. Power consumption in the reflection state is smaller than power consumption in the display state. In other words, when the applied voltage is lower than the threshold, the incident light is reflected in the display device 100. As a result, the power consumption in the reflection state can be reduced in the display device 100.

Figure 11:
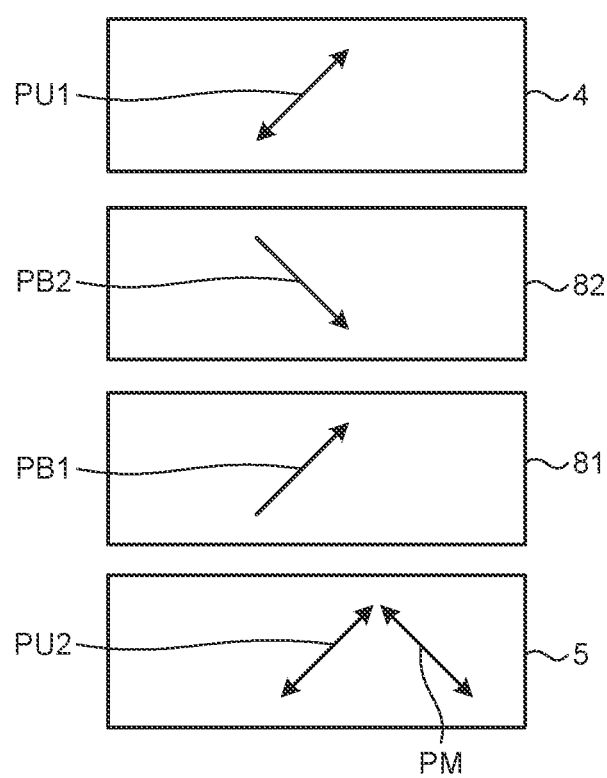
FIG. 11 is a descriptive view for schematically explaining a relation between a transmission axis of a first polarizing member and a transmission axis of an optical sheet.

FIG. 11 is a descriptive view for schematically explaining a relation between a transmission axis of the first polarizing member and a transmission axis of the optical sheet. FIG. 11 indicates a transmission axis direction PU1 of the first polarizing member 4, a rubbing direction PB2 of the orientation film 82, a rubbing direction PB1 of the orientation film 81, a transmission axis direction PU2 of the optical sheet 5, and a reflection axis direction PM of the optical sheet 5.

As illustrated in FIG. 11, the rubbing direction PB2 of the orientation film 82 and the rubbing direction PB1 of the orientation film 81 intersect with each other when seen from above. The transmission axis direction PU1 of the first polarizing member 4 and the transmission axis direction PU2 of the optical sheet 5 are parallel with each other. The transmission axis direction PU1 of the first polarizing member 4 and the reflection axis direction PM of the optical sheet 5 intersect with each other. The first polarizing member 4 and the optical sheet 5 transmit the linearly polarized light in the first polarization direction PA1.

In the embodiment, the front panel 1 has the insulating film 85 to prevent short circuit from easily occurring even with foreign matters between the first translucent electrode 14 and the second translucent electrode 15. The insulating film 85 may be provided between the second translucent electrode 15 and the orientation film 82 on the second substrate 12. The insulating films 85 may be provided on both of the first substrate 11 and the second substrate 12.

A potential between the first translucent electrode 14 and the second translucent electrode 15 can however be kept by being influenced by the insulating film 85 even when the applied voltage to the first translucent electrode 14 becomes lower than the threshold. The potential possibly gives influences on the reflection state. Alternatively, when static electricity applies an unintended potential, the potential of the static electricity is not discharged to deteriorate the liquid crystal layer 19 in some cases.

The display device 100 in the embodiment includes the display panel 2 and the front panel 1 overlapping with the display panel 2 and being switched into the reflection state in which incident light is reflected and the transmission state in which incident light is transmitted. The front panel 1 includes the first translucent electrode 14 provided on the liquid crystal layer 19 side of the first substrate 11, the second translucent electrode 15 provided on the liquid crystal layer 19 side of the second substrate 12, the discharge resistor 70, and the first conductive pillar 71. The discharge resistor 70 provided on the second substrate 12 is electrically coupled to the second translucent electrode 15. The first conductive pillar 71 electrically couples the first translucent electrode 14 and the discharge resistor 70. In the front panel 1, the first translucent electrode 14 and the second translucent electrode 15 are coupled to each other with the coupling wiring line 14a, the first conductive pillar 71, the coupling wiring line 15a, the discharge resistor 70, and the coupling wiring line 15b. As described above, the resistance value of the first translucent electrode 14 is 10 KΩ to 100 MΩ, so that there is no problem in switching between the reflection state and the display state by applying the applied voltage of equal to or higher than the threshold to the first translucent electrode 14. The potential between the first translucent electrode 14 and the second translucent electrode 15 is discharged by the discharge resistor 70 by lowering the applied voltage to the first translucent electrode 14 to be lower than the threshold. With this configuration, the display device 100 can be switched between the display state in which an image is displayed and the mirror state in which a reflected image is provided and can prevent charging between the electrodes.

Figure 12:
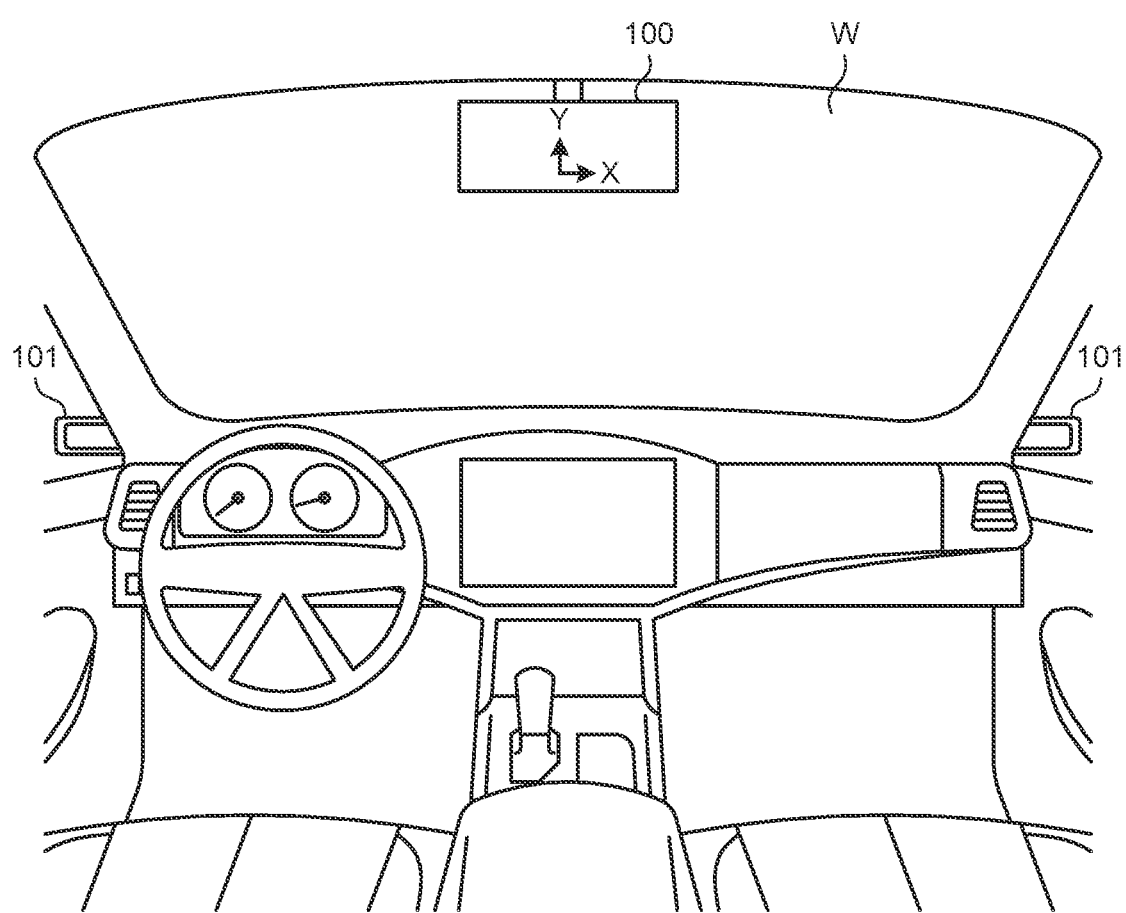
FIG. 12 is a view illustrating a mounting state of a room device.

FIG. 12 is a view illustrating a mounting state of a room device. In FIG. 12, the display device 100 in the embodiment is used as a room mirror arranged in an upper center portion of a window W. The room device is made into the reflection state in which incident light is reflected and the transmission state in which the incident light is transmitted and an image is able to be displayed.

When an applied voltage to the first translucent electrode 14 is lower than the threshold, the reflection state in which the incident light is reflected is made, and the display device 100 serves as a mirror that mirror-reflects the incident light from a rear part of the vehicle and enables the rear part of the vehicle to be viewed. The controller 9 illustrated in FIG. 8 does not display an image of the rear part BD of the vehicle 200 on the display panel 2 in the reflection state.

The display panel 2 of the display device 100 displays an image of the rear part that has been shot by the shooting device 201 (see FIG. 8) in the display state. Alternatively, the display panel 2 of the display device 100 may display an image around the vehicle that has been shot by a shooting device in the display state.

The display device 100 in the embodiment may be applied to a side mirror 101 of the vehicle. Although the side mirror 101 of the vehicle is arranged outside the vehicle, it may be arranged in the vehicle.

Although the preferred embodiment of the present disclosure has been described above, the present disclosure is not limited by the embodiment. Contents disclosed in the embodiment are merely examples, and various modifications can be made in a range without departing from the gist of the present disclosure. Appropriate modifications in a range without departing from the gist of the present disclosure naturally belong to the technical range of the present disclosure. For example, translucent optical resin or any of various films that does not inhibit effects provided by the aspect described in the embodiment may be provided between components of the first polarizing member 4, the optical sheet 5, the front panel 1, the second polarizing member 31, and the display panel 2 in the above-mentioned embodiment. The first polarizing member 4 may be the polarizing plate causing iodine to be adsorbed to the film of PVA and stretching in one direction to align the orientations of the molecules to the constant direction. In this case, the base material layer 64 is omitted, and the first polarizing member 4 is provided on the side of the second substrate 12 that is opposite to the liquid crystal layer 19.

Other operation and effect provided by the aspect described in the embodiment that are obvious from description of the present specification or at which those skilled in the art can arrive as appropriate should be interpreted to be provided by the present disclosure.

What is claimed is:

1. A display device comprising:
   a display panel; and
   a front panel overlapping with the display panel and being switched into a reflection state in which incident light is reflected and a transmission state in which incident light is transmitted, wherein
   the front panel includes
      a first substrate,
      a second substrate facing the first substrate,
      a liquid crystal layer sealed between the first substrate and the second substrate,
      a first translucent electrode provided on a side of the first substrate on which the liquid crystal layer is located,
      a second translucent electrode provided on a side of the second substrate on which the liquid crystal layer is located,
      a discharge resistor that is electrically coupled to the second translucent electrode and is provided on the second substrate, and
      a first conductive pillar that electrically couples the first translucent electrode and the discharge resistor.

2. The display device according to claim 1, further comprising a second conductive pillar for applying a voltage to the second translucent electrode, wherein the second conductive pillar and the discharge resistor are electrically coupled to each other through a coupling wiring line on the second substrate.

3. The display device according to claim 1, wherein the discharge resistor is made of chromium oxide.

4. The display device according to claim 1, wherein a resistance value of the discharge resistor is 10 kΩ to 100 MΩ.

5. A room device that is made into a reflection state in which incident light is reflected and a transmission state in which incident light is transmitted and an image is able to be displayed, the room device comprising a display device and a shooting device shooting an image of a rear part of a vehicle, wherein the display device includes
  a display panel, and
  a front panel overlapping with the display panel and being switched into a reflection state in which incident light is reflected and a transmission state in which incident light is transmitted,
the front panel includes
  a first substrate,
  a second substrate facing the first substrate,
  a liquid crystal layer sealed between the first substrate and the second substrate,
  a first translucent electrode provided on a side of the first substrate on which the liquid crystal layer is located,
  a second translucent electrode provided on a side of the second substrate on which the liquid crystal layer is located,
  a discharge resistor that is electrically coupled to the second translucent electrode and is provided on the second substrate, and
  a first conductive pillar that electrically couples the first translucent electrode and the discharge resistor.

* * * * *